(12) United States Patent
Maziers et al.

(10) Patent No.: US 8,826,844 B2
(45) Date of Patent: *Sep. 9, 2014

(54) THREE-LAYER ROTOMOULDED MOTORBOATS

(71) Applicant: Total Research & Technology Feluy, Seneffe (BE)

(72) Inventors: Eric Maziers, Seneffe (BE); Patrick Bardon, La Teich (FR)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,790

(22) Filed: Aug. 12, 2013

(65) Prior Publication Data

US 2014/0048967 A1  Feb. 20, 2014

Related U.S. Application Data

(63) Continuation of application No. 13/003,772, filed as application No. PCT/EP2009/058393 on Jul. 3, 2009, now Pat. No. 8,550,024.

(30) Foreign Application Priority Data

Jul. 16, 2008   (EP) .................................. 08160559

(51) Int. Cl.
*B63B 5/24* (2006.01)
*B63B 9/06* (2006.01)
*B63B 35/73* (2006.01)
*B29C 39/08* (2006.01)
*B29C 39/12* (2006.01)
*B29C 41/04* (2006.01)
*B29C 41/22* (2006.01)
*B29C 41/32* (2006.01)
*B32B 27/32* (2006.01)
*B29C 41/00* (2006.01)
*B29K 23/00* (2006.01)

(52) U.S. Cl.
CPC ........... *B29C 39/08* (2013.01); *B29K 2023/086* (2013.01); *B32B 27/32* (2013.01); *B29C 41/04* (2013.01); *B29K 2023/06* (2013.01); *B29C 41/003* (2013.01); *B29C 39/123* (2013.01); *B29C 41/22* (2013.01); *B63B 9/06* (2013.01)
USPC ...... 114/357; 264/45.7; 428/35.9; 428/304.4; 428/319.3

(58) Field of Classification Search
USPC ................................ 114/355, 357; 264/45.7, 264/171.26–171.29, 209.2; 428/35.7–35.9, 428/36.5, 71, 76, 304.4, 314.4, 319.3, 319.9
See application file for complete search history.

(56) References Cited

U.S. PATENT DOCUMENTS 8,550,024 B2 * 10/2013 Maziers et al. ............... 114/357

FOREIGN PATENT DOCUMENTS

| EP | 2 111 961 A1 | 10/2009 |
| EP | 2 123 419 A1 | 11/2009 |
| WO | 2009/130228 A1 | 10/2009 |

OTHER PUBLICATIONS

European Office Action issued in European Application No. 08 160 559.4-2124 dated Jul. 4, 2012 (6 pages).

* cited by examiner

*Primary Examiner* — Ajay Vasudeva

(57) ABSTRACT

This invention discloses three-layer rotomoulded motorboats having excellent floatability prepared from foamed polyethylene.

21 Claims, 3 Drawing Sheets

THREE-LAYER ROTOMOULDED MOTORBOATS

CROSS-REFERENCE TO RELATED APPLICATIONS

This application is a continuation of Ser. No. 13/003,772, filed Apr. 1, 2011, now issued as U.S. Pat. No. 8,550,024, which is 371 national stage entry of International Application No. PCT/EP2009/058393, filed Jul. 3, 2009, which claims priority from EP 08160559.4, filed Jul. 16, 2008.

This invention relates to the field of three-layer motorboats prepared from foamed polyethylene by rotomoulding.

Leisure motorboats covered by the present invention include either conventional motorboats or two-parts watercrafts comprising a main hull, devoid of independent power unit, and designed to receive a releasable vehicle equipped with a motor and inserted in the main hull in order to propel it.

Such two-part motorboats are disclosed for example in U.S. Pat. No. 5,372,083, or EP-495996, or FR-2852573, or U.S. Pat. No. 5,443,028, or pending patent application no FR-07/06576.

Such boats were typically prepared with polyester using two separately moulded parts that had to be assembled.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylene represents more than 80% of the polymers used in the rotomoulding market. This is due to the outstanding resistance of polyethylene to thermal degradation during processing, to its easy grinding, good flowability, and low temperature impact properties.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerisation of these polymer alloys requires a complex catalyst system comprising organometallic catalyst precursors, cationic forming cocatalysts and cross-over agents.

It is thus desired to produce articles prepared with two or more layers of similar or dissimilar material in order to improve the final properties of the finished product. It is however generally necessary to add a bonding layer or cross-linking in order to insure structural integrity.

There is thus a need to produce rotomoulded multilayer leisure boats that do not suffer from these drawbacks and that have a uniform smooth layer of foamed material.

It is an aim of the present invention to prepare three-layer rotomoulded motorboats having good adherence between layers of dissimilar material.

It is also an aim of the present invention to prepare three-layer rotomoulded motorboats wherein one of the layer is foamed polyethylene.

It is another aim of the present invention to prepare fully unsubmersible three-layer rotomoulded motorboats It is yet another aim of the present invention to prepare three-layer rotomoulded motorboats that can be processed easily and quickly.

It is a further aim of the present invention to prepare three-layer rotomoulded motorboats having good stiffness and rigidity while keeping elasticity.

It is also an aim of the present invention to prepare three-layer rotomoulded motorboats having controlled foam thickness.

Any one of these aims is at least partially fulfilled by the present invention.

Figure 1:
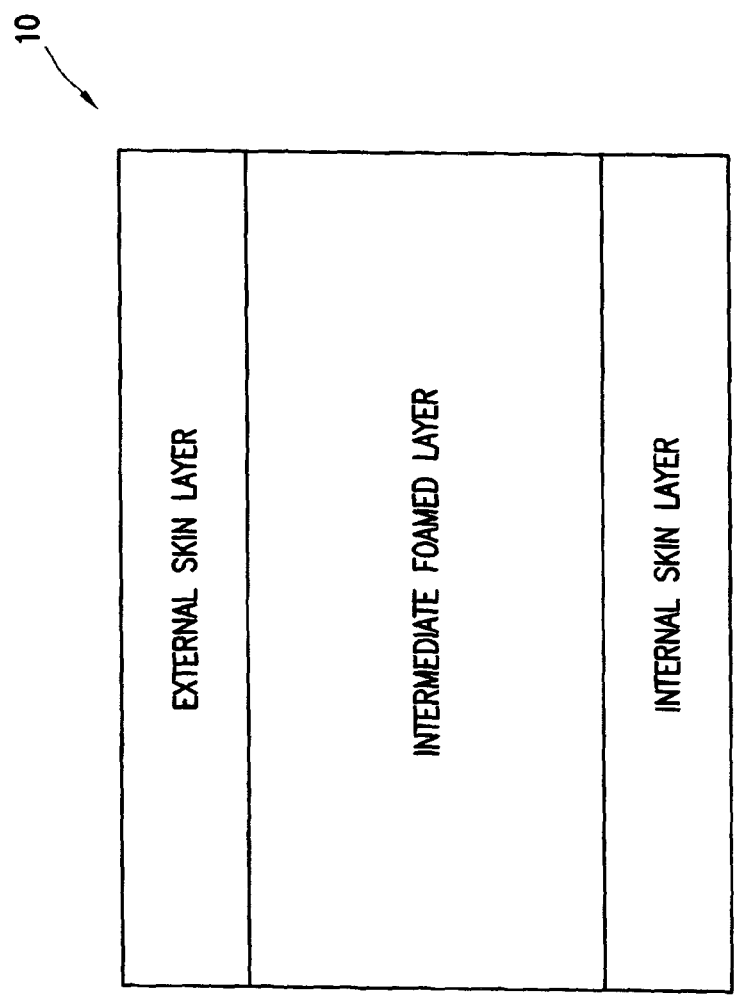
FIG. 1 depicts an article having an external skin layer, an intermediate foamed layer, and an internal skin layer according to one or more embodiments.

Accordingly, the present invention discloses the use of a resin composition comprising from 80 to 98 wt %, based on the weight of the resin composition, of metallocene-produced polyethylene, of from 0 to 20 wt % of grafted polyethylene and from 0 to 20 wt % of ionomer, with the restriction that at least one of grafted polyethylene or ionomer is not 0, for preparing three-layer rotomoulded motorboats consisting of:
a) an external skin layer comprising from 30 to 50 wt %, based on the weight of the external skin layer, of said resin composition and of from 50 to 70 wt % of a metallocene-produced polyethylene, the same as, or different from that of the resin composition;
b) an intermediate foamed layer comprising from 95 to 99.8 wt %, based on the weight of the foamed layer, of said resin composition and from 0.2 to 5 wt % of a foaming agent;
c) an internal skin layer consisting of a metallocene-produced polyethylene, the same as, or different from that used either in the external skin layer or in the resin composition,
said motorboats being characterised in that their floatability is obtained exclusively by the foamed layer.

Additional layers may be added in order to obtain desired properties such as for example creep resistance or high temperature resistance. These additional layers may be prepared from polyamide or ethylene/vinyl alcohol polymers (EVOH).

Preferably, the resin composition comprises from 85 to 97 wt %, based on the weight of the resin composition, of metallocene-produced polyethylene, more preferably of from 90 to 96 wt %, of from 1 to 10 wt %, more preferably 2 to 5 wt % of grafted polyethylene and from 1 to 10 wt %, more preferably 2 to 5 wt % of ionomer.

External skin layer a) comprises a composition prepared from homopolymers or copolymers of ethylene prepared with a metallocene catalyst system and an ionomer and/or a grafted polyolefin. In this description, copolymers are prepared from one monomer and one or more comonomers. The polyethylene may advantageously be replaced by a dry blend of metallocene-prepared polyethylene resins having different properties in order to tailor the properties of the external skin layer.

In a preferred embodiment according to the present invention, the external skin layer a) comprises from 35 to 45 wt %, based on the weight of skin layer a) of the resin composition, more preferably about 40 wt %, and preferably from 55 to 65 wt %, more preferably about 60 wt % of the metallocene-prepared polyethylne resin.

The metallocene-produced polyethylene may be same as or different from the polyethylene used in the resin composition. preferably, it is the same.

The grafted polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene.

Alternatively, an ionomer is used. An ionomer is a polyectrolyte that comprises copolymers containing both electrically neutral repeating units and a fraction of ionised units, usualy representing at most 15 percent of the polymer. They link in such a way that, even though they are stiff at room temperature, the bonds may be broken down thermally and the new linkages will cause the material to act as though it were a thermoplastic material. The ionic attractions that result, strongly influence the polymer properties, especially its mechanical properties. In an ionomer, the nonpolar chains are grouped together and the polar ionic groups are attracted to each other. This allows thermoplastic ionomers to act in ways similar to that of cross-linked polymers or block copolymers, but in fact they are called reversible cross-linkers. When heated, the ionic groups lose their attractions for each other and the chains become mobile. The chains motion increases with increasing temperature and the groups can no longer stay in their clusters. This produces a polymer that has the properties of an elastomer and the processability of a thermoplastic.

Suitable ionomers can for example be selected from poly (ethylene-co-methacrylic acid). This polymer is a sodium or zinc salt of copolymers derived from ethylene and methacrylic acid.

Grafted polyethylene provides excellent adhesion properties whereas ionomers enhance mechanical properties. In a more preferred embodiment according to the present invention, a mixture of ionomer and grafted polyethylene is added to the polyethylene composition. More preferably a 50/50 mixture of ionomers and grafted polyethlene is used.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or dimethylsilylene-bis(2-methyl-4-phenyl-indenyl) zirconium dichloride. The most preferred metallocene component is ethylene-bis-tetrahydroindenyl zirconium dichloride.

The melt index of the polyethylene used in the resin composition is typically at least equal to 0.5 dg/min, preferably of at least 1 dg/min. It is preferably at most equal to 25 dg/min, preferably of at most 20 dg/min. The melt flow index MI2 is measured following the method of standard test ASTM D 1283 at a temperature of 190° C. and a load of 2.16 kg.

The melt index of the meatllocene-produced polyethylene resin used in external skin layer a) is typically of at least 1 dg/min, preferably of at least 5 dg/min. It is preferably of at most 30 dg/min, preferably of at most 25 dg/min.

The density of the polyethylene used in the resin composition is of at least 0.920 g/cc, preferably of at least 0.930 g/cc. It is of at most 0.965 g/cc, preferably of at most 0.960 g/cc. The density is measured following the method of standard test ASTM D 1505 at 23° C.

The density of the metallocene-produced polyethylene resin used in external skin layer a) is typically of at least 0.930 g/cc, preferably of at least 0.935 g/cc. It is of at most 0.965 g/cc, preferably of at most 0.960 g/cc.

The density and melt index of the metallocene-produced polyethylene used in internal skin layer c) are preferably in the same ranges as those of the metallocene-produced polyethylene used in external skin layer a).

The polyethylene of the present invention may also have a bi- or multimodal molecular weight distribution, i.e. they may be a blend of two or more polyethylenes with different molecular weight distributions, which can be blended either physically or chemically, i.e. produced sequentially in two or more reactors.

The polydispersity D of the polyethylene suitable for the present invention is in the range 2 to 20, preferably 2 to 15, more preferably less than or equal to 10, and most preferably less than or equal to 6, the latter range being typically associated with the preferred metallocene-prepared polyethylene resins. The polydispersity index D is defined as the ratio $M_w/M_n$ of the weight average molecular weight $M_w$ over the number average molecular weight $M_n$.

The resins of the present invention may also comprise other additives such as for example antioxidants, acid scavengers, antistatic additives, fillers, slip additives or anti-blocking additives, processing aid, anti algae additives or anti-fouling agents.

The foamed polyethylene layer b) is prepared by standard techniques with chemical blowing agents, but it is characterised by the use of a metallocene-prepared polyethylene that includes an ionomer. It has been surprisingly observed that the combined use of metallocene-produced polyethylene including an ionomer with the blowing agent produces a very homogeneous and regular foam.

The composition may be prepared by extruding the polyethylene composition either with a masterbatch comprising the foaming agent or directly with the foaming agent. Alternatively, and preferably, the polyethylene composition and chemical blowing agent are dry blended and introduced directly into the mould during the rotomoulding cycle.

In order to foam polyethylene a blowing agent must fulfill several requirements:
  the decomposition temperature of the blowing agent is compatible with the processing temperature of the polymer;
  the liberation of the blowing gas occurs within a defined temperature range of about 10° C. and is controllable during the process;
  the decomposition is not autocatalysed in order to avoid overheating;
  the blowing gas is chemically inert, such as preferably nitrogen, carbon dioxide and water;
  the chemical blowing agent is homogeneously and easily incorporated in and compatible with polyethylene.

During foaming process, at elevated temperatures, chemical blowing agents undergo chemical reactions, mostly decomposition, that liberate the blowing gas, typically $N_2$, $CO$, $CO_2$, $NH_3$ and water.

The chemical agents that can be used in the present invention can function according to three main processes:

1. Irreversible reaction: AB-->C+gas. They can be selected from the group consisting of azo compounds, hydrazine derivatives, semicarbazides, tetrazoles and nitroso compounds.
2. Equilibrium reactions: AB<--->C+gas. They can be selected from the group consisting of bicarbonates and carbonates.
3. Combination of compounds that liberate gasses as a result of their chemical interactions: A+BG-->AB+gas.

The blowing agents can be selected from:
exothermic such as for example azodicarbonamide (AZ) or 4,4'-oxy-bis(benzenesulfonylhydrazide) (OB); or
endothermic such as for example sodium bicarbonate (SB).

Azo compounds such as for example azodicarbonamide decompose at a temperature of from 160 to 215° C. and liberate about 220 ml/g of gas, mostly $N_2$, CO, $CO_2$, $NH_3$ and water.

Hydrazides such as for example or 4,4'-oxy-bis(benzenesulfonylhydrazide) decompose at a temperature of from 140 to 160° C. and liberate 120 to 140 ml/g of gas, mostly $N_2$ and $H_2O$. This type of agent is particularly preferred as it is exothermic and releases only neutral gases.

Carbonates such as for example $NaHCO_3$ in combination with citric acid decompose at a temperature of from 150 to 230° C. and liberate 140 to 230 ml/g of gas, mostly $CO_2$ and $H_2O$.

The amount of blowing agent is of at least 0.2 wt % based on the total weight of the foamed polyethylene composition of the intermediate layer, preferably of at least 1 wt %. It is of at most 5 wt %, preferably of at most 3 wt %. The most preferred amount is of about 2.5 wt %.

The exothermic agents have a much higher decomposition rate than the endothermic agents.

Multiple layers object can be prepared either by manual introduction of material during the moulding cycle, or by the use of a drop-box, or by a one-shot system.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:
the temperature at which the subsequent layer is added: it is critical for determining the wall thickness of the previous skin formed and how well the two layers may be bound together;
the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The present invention also discloses a method for preparing three-layer rotomoulded motorboats that comprises the steps of:
a) feeding the composition of external skin layer a) as a dry blend into a mould;
b) placing the filled mould in pre-heated oven;
c) rotating the filled mould about two perpendicular axes;
d) feeding the the composition of the foamed intermediate layer as a dry blend of polethylene composition and chemical blowing agent;
e) repeat steps b) and c);
f) feeding the composition of internal skin layer c);
g) repeat steps b) and c);
h) optionally feeding desired additional layers.

Alternatively, the chemical blowing agent can be introduced during the rotomoulding cycle by a teflon tube.

The first key point in the process is the time at which the temperature inside the mould reaches the melting temperature of the external polyethylene skin layer. The intermediate layer comprising polyethylene and foaming agent is injected as soon as or just before that first melting temperature is reached.

The second key point in the process is the time at which the temperature inside the mould reaches the melting temperature of the polyethylene composition/foaming agent composition. The internal polyethylene skin layer is injected as soon as or just before that second melting temperature is reached.

The intermediate layer polyethylene composition and foaming agent is injected at an internal air temperature situated between 120 and 140° C.

The internal polyethylene skin layer is injected at an internal air temperature situated between 125 and 145° C.

The internal air temperature must be compatible with the foaming temperature and is preferably of at most 150° C. during the whole cycle time.

The mould is built to sustain an internal temperature of about 200° C.

Typically, the oven temperature is of from 260 to 300° C.
The mould is typically cooled with cold air.

This invention is particularly suitable for preparing articles that demand stiff and rigid walls such as motorboats having a length of up to 12 m. Preferably they have a length of from 5 to 10 m. The size of the oven imposes an upper limit on the size of the mould but if large oven become available, the method and material can be extended to larger structures.

In one embodiment according to the present invention, the motorboat comprises a main hull devoid of power unit and offering a berthing area at the rear end, suitable for receiving a small watercraft equipped with propulsion means. In order to block the small watercraft, both vertically and laterally, the main hull is equipped with railings that are exactly designed to conform to the peripheral belts of said small watercraft. Detailed structural explanations can be found in pending application no FR-07/6576. The small powered watercraft is preferably a jet-ski.

In another embodiment according to the present invention, the motorboat has a conventional design and consists of a main body equipped with a motor.

The boats according to the present invention have a much smaller weight than an equivalent watercraft prepared from polyester, the weight reduction being of at least 20% with respect to said polyester boat, preferably of 25%. Such weight reduction implies a substantial energy saving.

They are characterised by an excellent floatability, produced exclusively by the foamed layer. In addition, as the foam presents a closed-cell structure, it cannot absorb water and the structure is thus absolutely unsubmersible even if the external skin layer is punctured or if the watercraft is broken into separate pieces, each piece being unsubmersible. It therefore offers a unique level of security.

Anti-algae additives or anti-fouling agents can be compounded with the resin of the external skin layer.

In a preferred embodiment according to the present invention, pigments are added to the resin of the external skin layer, preferably by compounding. The preferred pigments are black or white.

The thickness of each layer is determined by the size of the final product, by the desired properties and by the cost: it can vary from 0.5 mm up to several cm. In the present invention directed to three-layer motorboats, the external skin layer has a thickness of from 1 to 20 mm, the intermediate foamed layer has a thickness of a from 3 to 50 mm, preferably, from 3 to 30 mm, and the internal skin layer has a thickness of from 0.5 to 2.5 mm.

The resulting boats are characterised by an excellent stiffness.

The boats of the present invention are also ecologically friendly as they are fully recyclable: they can be reground and used in the same or other applications.

The motorboat of the present invention exhibit very little deformation when subjected to speed and/or turbulent sea. They can also resist the strong impacts occasioned by swell.

The power of the motor is not particularly limited but must be adjusted to the size and weight of the watercraft.

Typically, a boat having a length of 5 m and a weight of about 320 kg can accept a motor of from 150 to 210 horse powers, and thus reach speeds of up to 30 knots.

EXAMPLE

Preparation of a three-layer motorless hull having a length of 5 m.

The external skin layer was prepared with a 60/40 mixture of resin M4041® and M3671® under powder form, both commercially available from Total Petrochemicals under pellet form. M40410 is a polyethylene having a density of 0.940 g/cc and a melt index MI2 of 4 dg/min. M3671® is a polyethylene composition having a density of 0.941 g/cc and a melt index MI2 of 3.5 dg/min. These pellets were compounded with white pigments and then ground. The layer had a thickness of about 6 mm.

The foamed intermediate layer was prepared from 97.5 wt % of resin composition M3671® under pellet form, and 2.5 wt % of chemical blowing agent sold by Lanxess Distribution GmbH under the name Genitron OB®. Resin M3671® is a natural resin having a density of 0.941 g/cc and a melt index MI2 of 3.5 dg/min. These pellets were ground. The layer had a thickness of about 17 mm.

the internal skin layer was prepared from a natural polyethylene powder commercially available under the name M4043 UV®. It has a density of 0.940 g/cc and a melt index MI2 of 4 dg/min. It had a thickness of about 1.5 mm.

The total weight of the boat was of 320 kg

FIG. 1 depicts the article 10 according to one or more embodiments, including the external skin layer, intermediate foamed layer, and internal skin layer.

Figure 2:
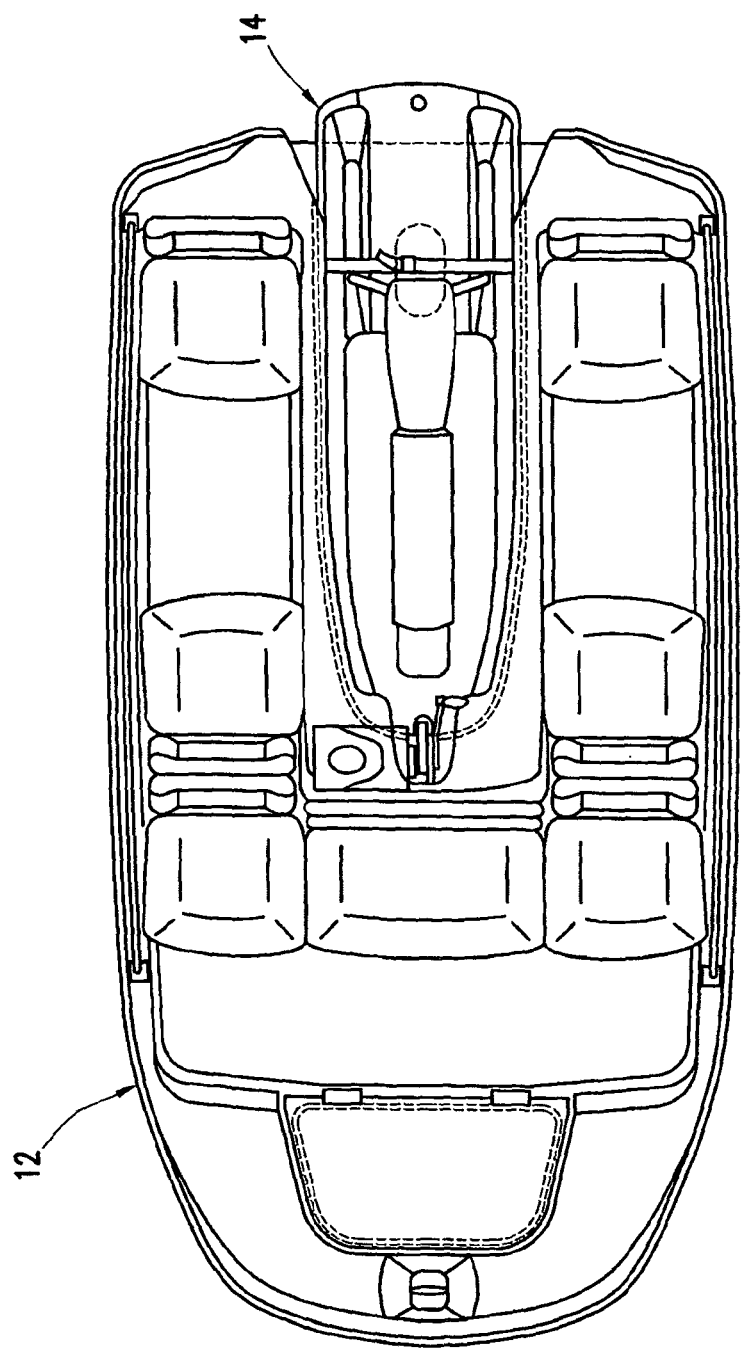
FIG. 2 depicts a motorboat devoid of a power unit and designed to receive a releasable powered small watercraft, such as a jet-ski, according to one or more embodiments.

FIG. 2 depicts the motorboat 12 according to one or more embodiments. The motorboat 12, as depicted, is devoid of a power unit and is designed to receive a releasable powered small watercraft 14. The releasable powered small watercraft 14 is depicted as a jet-ski.

Figure 3:
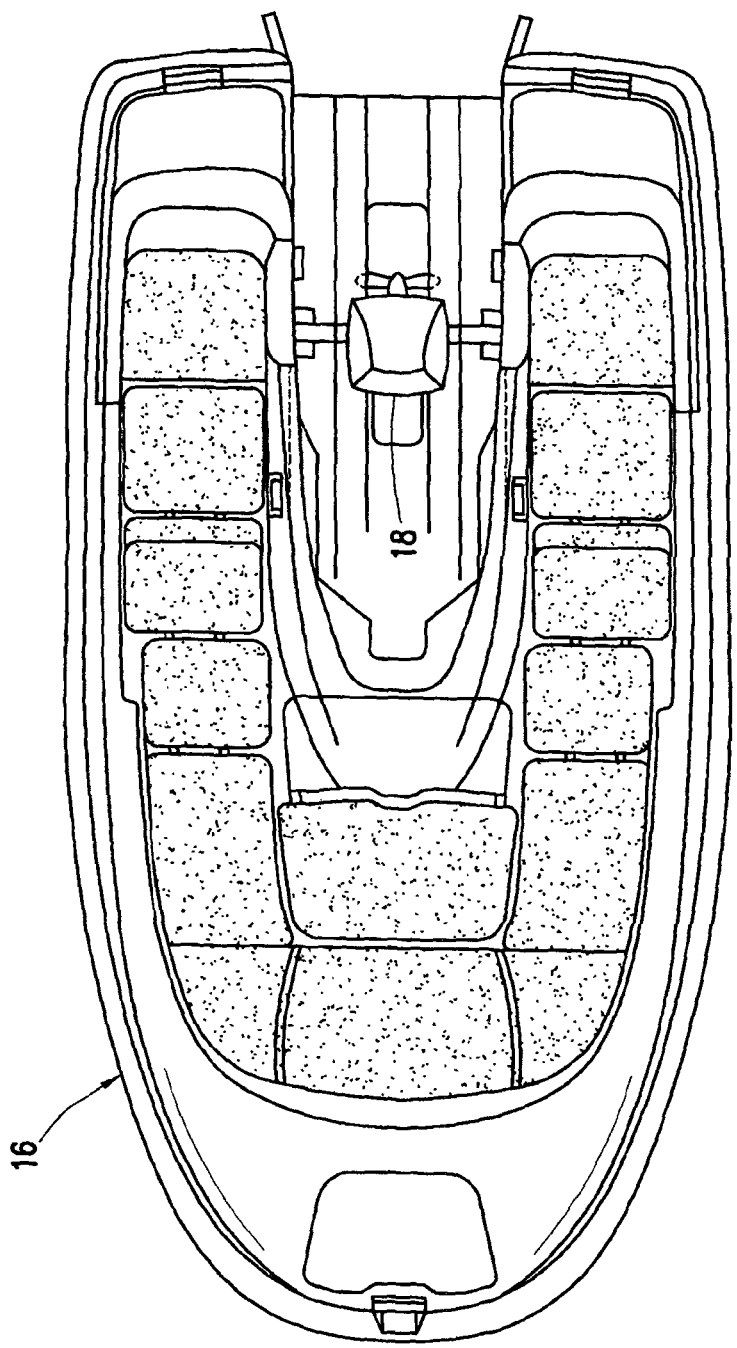
FIG. 3 depicts a motorboat equipped with a motor according to one or more embodiments.

FIG. 3 depicts a motorboat 16 equipped with a motor 18 according to one or more embodiments.

The invention claimed is:

1. A method for producing a rotomolded article comprising:

rotating an external skin layer composition, an intermediate foamed layer composition, and an internal skin layer composition in a mold to form an external skin layer comprising the external skin layer composition, an intermediate foamed layer comprising the intermediate foamed layer composition, and an internal skin layer comprising the internal skin layer composition;

wherein the external skin layer composition comprises from 30 to 50 wt %, based on the weight of the external skin layer, of a resin composition and from 50 to 70 wt % of a metallocene-produced polyethylene, the same as, or different from that of the resin composition;

wherein the intermediate foamed layer composition comprises from 95 to 99.8 wt %, based on the weight of the intermediate foamed layer, of the resin composition and from 0.2 to 5 wt % of a foaming agent;

wherein the internal skin layer composition comprises a metallocene-produced polyethylene, the same as, or different from that used either in the external skin layer or in the resin composition; and wherein the resin composition comprises from 80 to 98 wt %, based on the weight of the resin composition, of metallocene-produced polyethylene, and from 0 to 20 wt % of grafted polyethylene and from 0 to 20 wt % of ionomer, with the restriction that at least one of the grafted polyethylene or the ionomer is not 0 wt %.

2. The method of claim 1, wherein the internal skin layer composition consists of the metallocene-produced polyethylene, the same as, or different from that used either in the external skin layer or in the resin composition.

3. The method of claim 1, wherein the intermediate foamed layer comprises a closed-cell structure.

4. The method of claim 1, wherein the external skin layer contains pigments.

5. The method of claim 1, wherein the external skin layer contains anti-algae or anti-fouling agents.

6. The method of claim 1, wherein the external skin layer composition, the intermediate foamed layer composition, and the internal skin layer composition are fed into the mold prior to rotating the mold.

7. The method of claim 1, wherein the external skin layer composition is fed into the mold and the mold is rotated to form the external skin layer prior to feeding the intermediate foamed layer composition into the mold, and wherein the intermediate foamed layer composition is fed into the mold and the mold is rotated to form the intermediate foamed layer prior to feeding the internal skin layer composition into the mold.

8. The method of claim 1, wherein the external skin layer composition and the intermediate foamed layer composition are both fed into the mold as dry blends.

9. The method of claim 1, wherein the mold placed into a pre-heated oven prior to rotating the mold.

10. The method of claim 9, wherein the pre-heated oven is at a temperature ranging from 260° C. to 300° C.

11. The method of claim 1, wherein the mold is rotated about two perpendicular axes.

12. The method of claim 1, wherein the intermediate foamed layer composition is fed into the mold as soon as or just before the melting temperature of the external skin layer composition is reached within the mold.

13. The method of claim 1, wherein the intermediate foamed layer composition is fed into the mold at an internal air temperature within the mold that is between 120° C. and 140° C.

14. The method of claim 1, wherein the internal skin layer composition is fed into the mold as soon as or just before the melting temperature of the intermediate foamed layer composition is reached within the mold.

15. The method of claim 1, wherein the internal skin layer composition is fed into the mold at an internal air temperature within the mold that is between 125° C. and 145° C.

16. The method of claim 1, an internal air temperature within the mold is at most 150° C. during the rotomolding.

17. The method of claim 1, wherein the rotomoulded article comprises a boat having a hull.

18. The method of claim 17, wherein the boat is a motorboat devoid of a power unit and designed to receive a releasable powered small watercraft, or the boat is a motorboat equipped with a motor.

19. The method of claim 18, wherein the boat is the motorboat devoid of a power unit and designed to receive the releasable powered small watercraft, and wherein the releasable powered small watercraft is a jet-ski type watercraft.

20. The method of claim 1, wherein the rotomoulded article is an unsubmersible.

21. The method of claim 1, wherein the rotomoulded article is fully recyclable.

* * * * *